(12) United States Patent
Sanghvi et al.

(10) Patent No.: US 11,620,757 B2
(45) Date of Patent: Apr. 4, 2023

(54) DENSE OPTICAL FLOW PROCESSING IN A COMPUTER VISION SYSTEM

(71) Applicant: TEXAS INSTRUMENTS INCORPORATED, Dallas, TX (US)

(72) Inventors: Hetul Sanghvi, Murphy, TX (US); Mihir Narendra Mody, Bangalore (IN); Niraj Nandan, Plano, TX (US); Anish Reghunath, Plano, TX (US); Michael Peter Lachmayr, Boxford, MA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/533,256

(22) Filed: Nov. 23, 2021

(65) Prior Publication Data
US 2022/0084215 A1    Mar. 17, 2022

Related U.S. Application Data

(63) Continuation of application No. 16/585,333, filed on Sep. 27, 2019, now Pat. No. 11,182,908, which is a continuation of application No. 15/638,123, filed on Jun. 29, 2017, now Pat. No. 10,467,765.

(51) Int. Cl.
  *G06T 7/20* (2017.01)
  *G06T 7/246* (2017.01)
  *G06T 7/269* (2017.01)

(52) U.S. Cl.
  CPC ............ *G06T 7/251* (2017.01); *G06T 7/20* (2013.01); *G06T 7/246* (2017.01); *G06T 7/269* (2017.01); *G06T 2207/10016* (2013.01); *G06T 2207/10028* (2013.01); *G06T 2207/30252* (2013.01); *G06T 2207/30261* (2013.01)

(58) Field of Classification Search
  CPC .......... G06T 7/251; G06T 7/20; G06T 7/246; G06T 7/269; G06T 2207/10016; G06T 2207/10028; G06T 2207/30252; G06T 2207/30261
  See application file for complete search history.

(56) References Cited

U.S. PATENT DOCUMENTS

| | | | |
|---|---|---|---|
| 6,303,920 | B1 | 10/2001 | Wixson |
| 6,483,874 | B1 | 11/2002 | Panusopone et al. |
| 6,642,940 | B1 | 11/2003 | Dakss et al. |
| 2011/0026596 | A1 | 2/2011 | Hong |

(Continued)

*Primary Examiner* — Siamak Harandi
(74) *Attorney, Agent, or Firm* — Carl G. Peterson; Frank D. Cimino

(57) ABSTRACT

A computer vision system is provided that includes an image generation device configured to generate consecutive two dimensional (2D) images of a scene, and a dense optical flow engine (DOFE) configured to determine a dense optical flow map for pairs of the consecutive 2D images, wherein, for a pair of consecutive 2D images, the DOFE is configured to perform a predictor based correspondence search for each paxel in a current image of the pair of consecutive 2D images, wherein, for an anchor pixel in each paxel, the predictor based correspondence search evaluates a plurality of predictors to select a best matching pixel in a reference image of the pair of consecutive 2D images, and determine optical flow vectors for each pixel in a paxel based on the best matching pixel selected for the anchor pixel of the paxel.

20 Claims, 7 Drawing Sheets

(56) References Cited

U.S. PATENT DOCUMENTS

| | | |
|---|---|---|
| 2012/0127267 A1 | 5/2012 | Zhang et al. |
| 2015/0365696 A1 | 12/2015 | Garud et al. |
| 2017/0161565 A1 | 6/2017 | Garud et al. |
| 2018/0189234 A1* | 7/2018 | Nurvitadhi .............. G06F 17/16 |

* cited by examiner

US 11,620,757 B2

DENSE OPTICAL FLOW PROCESSING IN A COMPUTER VISION SYSTEM

CROSS-REFERENCE TO RELATED APPLICATIONS

This application is a continuation of prior U.S. application Ser. No. 16/585,333, filed Sep. 27, 2019, which is a continuation of prior U.S. application Ser. No. 15/638,123, filed Jun. 29, 2017, now U.S. Pat. No. 10,467,765, each of which is herein incorporated by reference in its entirety.

BACKGROUND OF THE DISCLOSURE

Field of the Disclosure

Embodiments of the present disclosure generally relate to computer vision systems, and more specifically relate to dense optical flow processing in such systems.

Description of the Related Art

Advanced driver assistance systems, or ADAS, are becoming increasingly commonplace in automobiles. These systems provide the driver with the information about the surrounding and potentially automatically intervene with the process of driving to prevent accidents and road fatalities. Three dimensional (3D) scene understanding using image sensors is an elementary step in building this scene understanding. Scene motion understanding using optical flow is a common technique that provides accurate motion estimation. For determining optical flow, one camera is employed to capture temporal sequences of images (video) of the same scene. Pairs of consecutive images are processed to determine the displacement of pixels between consecutive images. The displacement or flow vector information for the pixels can be used to analyze the motion of objects/volume corresponding to the pixels in the captured scene.

One approach to optical flow that may be used in embedded safety systems is sparse optical flow. Sparse optical flow is a feature-based approach in which only the flow of selected pixels, e.g., features such as image edges, corners, etc., is identified across consecutive images. A more accurate approach to optical flow is dense optical flow in which the flow of all pixels in consecutive images is identified. Using dense optical flow in embedded systems is challenging given the real time processing requirements of such systems as current approaches to dense optical flow processing may be computation intensive and require significant data bandwidth.

SUMMARY

Embodiments of the present disclosure relate to methods and apparatus for dense optical flow processing in a computer vision system. In one aspect, a computer vision system is provided that includes an image generation device configured to generate consecutive two dimensional (2D) images of a scene, and a dense optical flow engine (DOFE) configured to determine a dense optical flow map for pairs of the consecutive 2D images, wherein, for a pair of consecutive 2D images, the DOFE is configured to perform a predictor based correspondence search for each paxel in a current image of the pair of consecutive 2D images, wherein, for an anchor pixel in each paxel, the predictor based correspondence search evaluates a plurality of predictors to select a best matching pixel in a reference image of the pair of consecutive 2D images, and determine optical flow vectors for each pixel in a paxel based on the best matching pixel selected for the anchor pixel of the paxel.

In one aspect, a method of operating a computer vision system to determine a dense optical flow map for two consecutive two dimensional (2D) images of a scene is provided that includes performing a predictor based correspondence search for each paxel in a current image of the two consecutive 2D images, wherein, for an anchor pixel in each paxel, the predictor based correspondence search evaluates a plurality of predictors to select a best matching pixel in a reference image of the two consecutive 2D images, the search performed by a dense optical flow engine (DOFE) comprised in the computer vision system, and determining optical flow vectors for each pixel in a paxel based on the best matching pixel selected for the anchor pixel of the paxel, the determining performed by the DOFE.

BRIEF DESCRIPTION OF THE DRAWINGS

Particular embodiments will now be described, by way of example only, and with reference to the accompanying drawings.

DETAILED DESCRIPTION OF EMBODIMENTS OF THE DISCLOSURE

Figure 1:
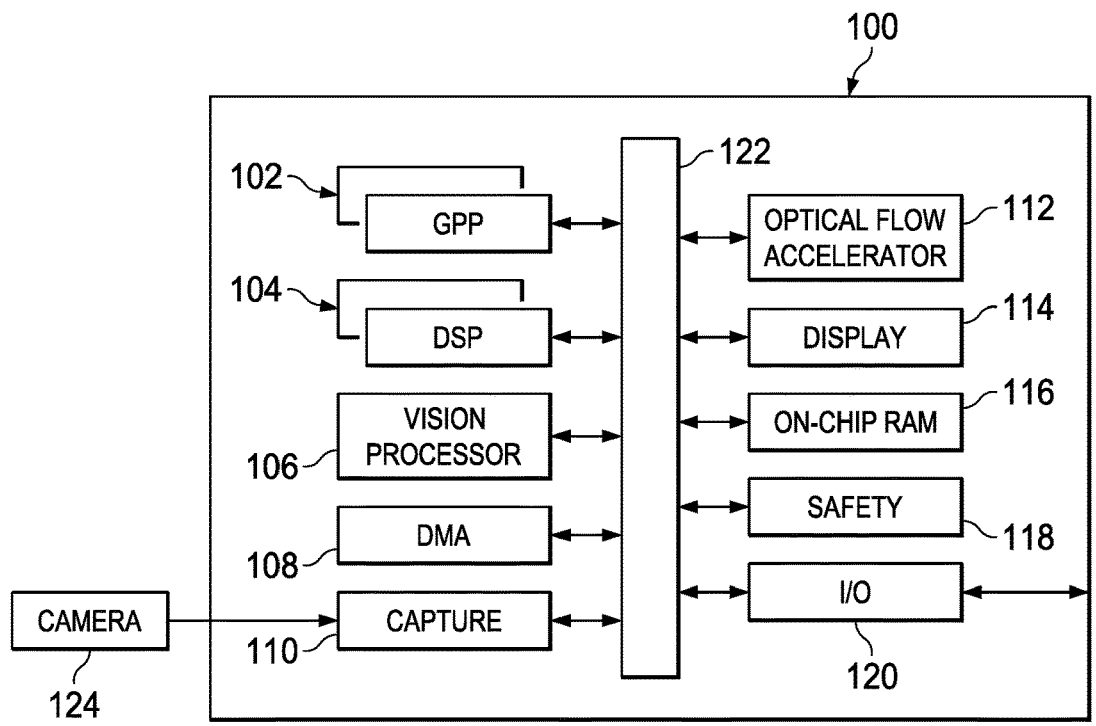
FIG. 1 is a high level block diagram of an example multiprocessor system-on-a-chip (SOC)

Specific embodiments of the disclosure will now be described in detail with reference to the accompanying figures. Like elements in the various figures are denoted by like reference numerals for consistency.

A moving object in the real world has a three dimensional (3D) motion. A camera capturing a moving object captures a two dimensional (2D) projection of the actual 3D motion. The 2D motion of a moving object can be determined by observing consecutive captured images of the object. The 2D motion of an image pixel from image to image is referred to as the optical flow of the pixel and is defined as the displacement vector of the pixel between two consecutive images. For dense optical flow, the optical flow of each pixel is determined.

Determination of the optical flow of a pixel is fundamentally a "best correspondence" finding problem. That is, given two consecutive images, the problem is to find the best matching position of a pixel in the older image in the newer image. In general, the search for the best matching pixel is performed within a predetermined region, referred to as the search range, in the newer image. A predictor based search strategy may be used to avoid searching for correspondence at every pixel in the search range.

Embodiments of the disclosure provide for dense optical flow processing in an embedded computer vision system that meets real time performance requirements. In some embodiments, a hardware accelerator for dense optical flow map calculation is provided. The hardware accelerator includes novel features that improve the performance of dense optical flow computation such as a paxel based search for matching pixels that reduces search time, a hierarchical data organization with tiling to manage data bandwidth, and/or advanced predictor evaluation that avoids refetching of data.

FIG. 1 is a high level block diagram of an example multiprocessor system-on-a-chip (SOC) 100 configured to support computer vision processing in a camera-based ADAS. The SOC 100 includes dual general purpose processors (GPP) 102, dual digital signal processors (DSP) 104, a vision processor 106, and an optical flow accelerator 112 coupled via a high speed interconnect 122. As is explained in more detail herein, the optical flow accelerator 112 is configured to perform dense optical flow processing on incoming pairs of camera images. The vision processor 106 is a vector processor tuned for computer vision processing such as gradient computation, orientation binning, histogram normalization, etc. The GPP 102 hosts the operating system and provides overall control of the operation of the SOC 100 including scheduling of the processing performed by the optical flow accelerator 112. The DSP 104 provides support for computer vision processing such as object detection and classification, which may use the output of the optical flow accelerator 112.

The SOC 100 further includes a direct memory access (DMA) component 108, a camera capture component 110 that may be coupled to an external camera 124, a display management component 114, on-chip random access (RAM) memory 116, e.g., a computer readable medium, and various input/output (I/O) peripherals 120 all coupled to the processors and the optical flow accelerator 112 via the interconnect 122. The camera 124 may be coupled to the SOC 100 via an analog connection, an Ethernet cable, a low-voltage differential signaling (LVDS) cable, or other suitable wired or wireless connection. In addition, the SOC 100 includes a safety component 118 that includes safety related functionality to enable compliance with automotive safety requirements. Such functionality may include support for CRC (cyclic redundancy check) of data, clock comparator for drift detection, error signaling, windowed watch-dog timer, and self testing of the SOC for damage and failures.

Figure 2:
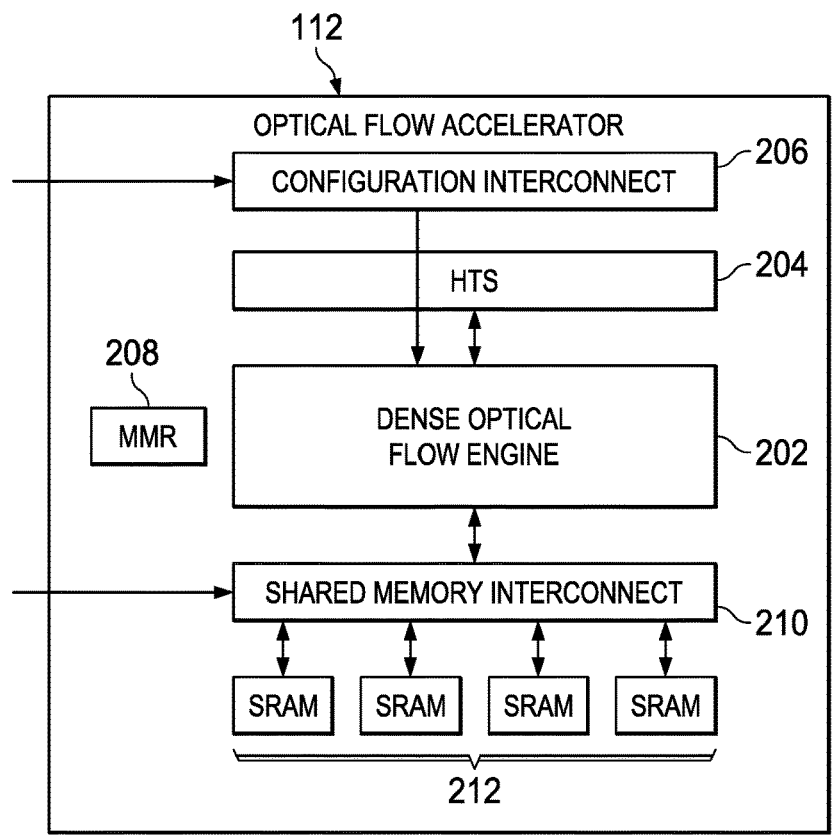
FIG. 2 is high level block diagram of an example optical flow accelerator of the SOC of FIG. 1.

FIG. 2 is a high level block diagram of an example optical flow accelerator 112. The optical flow accelerator 112 includes a configuration interconnect 206, a hardware thread scheduler (HTS) 204, a dense optical flow engine (DOFE) 202, memory mapped registers (MMR) 208, a shared memory interconnect 210, and shared memory 212.

The configuration interconnect 206 provides an interface for configuring the parameters of the optical flow accelerator 112. The configuration interconnect 206 also provides an interface for observing the status to the processing performed by the optical flow accelerator 112.

The HTS 204 implements thread management and control triggering of processing threads in the DOFE 202. The HTS 204 also manages message transfer and control between the optical flow accelerator 112 and other components in the SOC 100, e.g., the DSP 104.

The shared memory 212 stores input and output data for the dense optical flow engine 202. The shared memory 212 includes four banks of static random access memory. The shared memory interconnect 210 is a crossbar with pipelined command and response handling. The DMA 108 is connected to the shared memory interconnect 210 and is used to move data for processing by the DOFE 202 into the shared memory and to move the optical flow data produced by the DOFE 202 out of the optical flow accelerator 112 for consumption by other components on the SOC 100.

The MMR 208 is configured to store various control and configuration parameters for the DOFE 202. Parameters may include buffer sizes and addresses in the shared memory 212, horizontal and vertical search ranges, confidence score configuration values, etc.

The DOFE 202 is configured to find the optical flow vector map between all pixels of a pair of input images, referred to as the reference image and the current image herein. The current image is the image received at time t-1 and the reference image is the image received at time t. The dense optical flow approach implemented by the DOFE 202 is based on motion/flow vector predictors and uses a coarse-to-fine correspondence search strategy leveraging image pyramids of the reference image and the current image.

The coarse-to-fine correspondence search is based on the fact that a large displacement of a pixel between two consecutive images can be reduced to a smaller displacement at lower spatial resolution, thereby reducing the complexity of the correspondence search problem. For this search approach, a successively scaled down image structure is created from each input image. For example, a Gaussian image pyramid for an image may be created by filtering an input image using a 5×5 Gaussian low pass filter and then down sampling the filtered image by a factor of two in the horizontal and vertical directions. The resulting image is then subjected to the same process, and the cycle is repeated until the desired number of pyramid levels, e.g., six levels, is generated. Each cycle of this process results in a smaller image with increased smoothing and decreased spatial sampling density, i.e., decreased image resolution.

In the resulting pyramid, the original image may be referred to as the base pyramid level or level 0 and the smaller resolution images may be referred to as higher pyramid levels, e.g., levels 1 to 5, assuming there are five higher levels. Note that in the example Gaussian image pyramid, each pyramid level is ¼ the size of the next lower level. Thus a pixel at a particular pyramid level corresponds to a 2×2 block of four pixels at the next lower pyramid level. Also a distance measured at a higher pyramid level is ½ of the distance at the next lower pyramid level.

Figure 3:
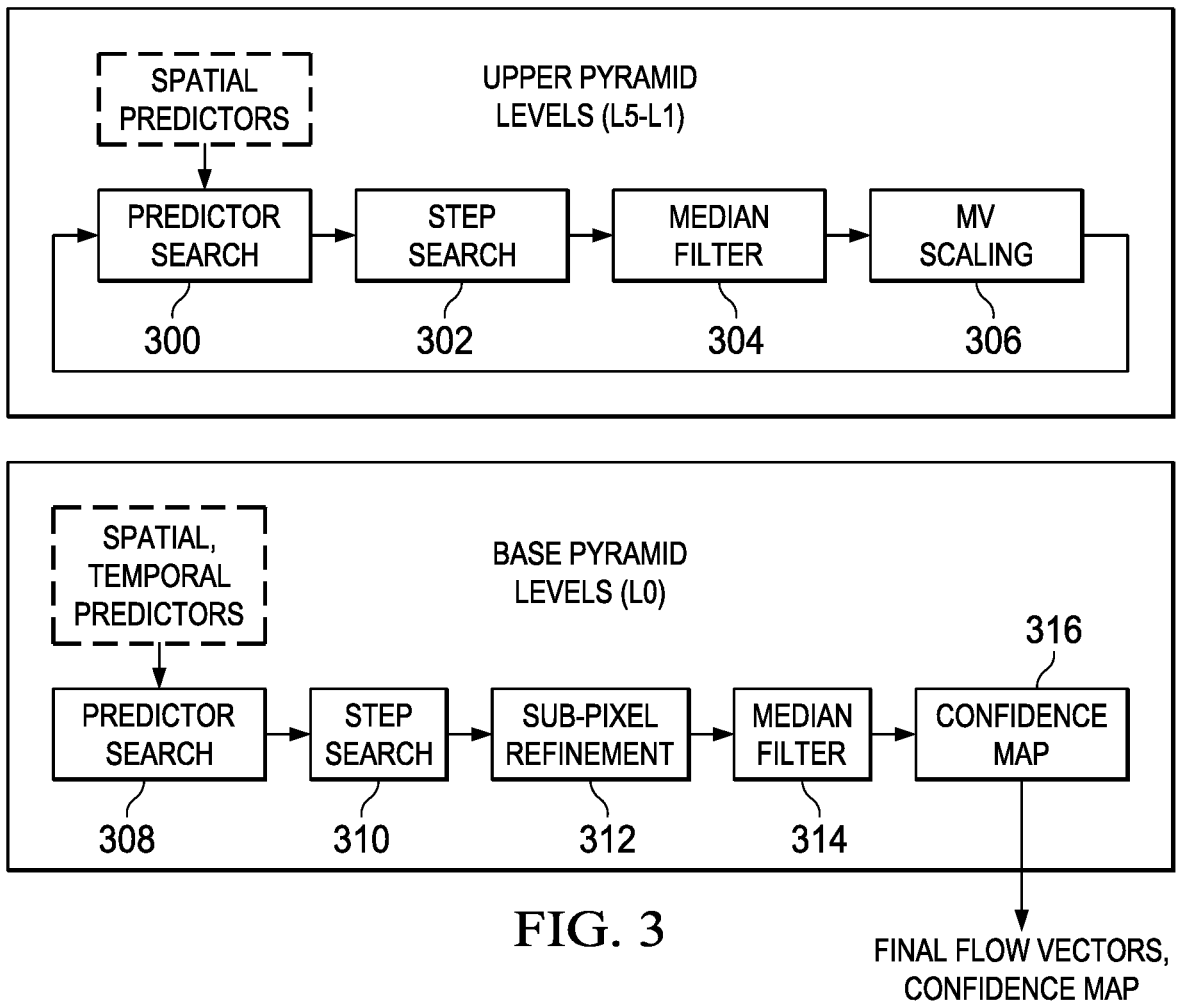
FIG. 3 illustrates the processing steps of the dense optical flow engine (DOFE) of the optical flow accelerator of FIG. 2 to generate a dense optical flow vector map.

FIG. 3 illustrates the processing steps of the DOFE 202 to generate a dense optical flow vector map. This figure assumes that the image pyramids have five upper levels generated as described above. One of ordinary skill in the art will understand that more or few levels may be used. Each of the pyramid levels is processed in turn to generate an optical flow vector for each pixel in the level image beginning with the highest pyramid level. At each upper pyramid level, a predictor based search strategy 300 is applied to find an initial match which is then further refined with a hierarchical step search strategy 302 resulting in an integer pixel accurate flow vector for each pixel. A median filter 304 is applied to the flow vectors to remove impulsive estimation noise. The filtered flow vectors are scaled up 306 by two and used as initial predictors at the next lower pyramid level.

At the base pyramid level, the predictor based search strategy 308 is applied to original images to find initial matches which are then further refined with the hierarchical step search strategy 310 resulting in an estimated integer pixel accurate flow vector for each pixel. After determining the integer pixel flow vectors, the pixel correspondence is further refined 312 to a sub-pixel level accuracy. A median filter 314 is applied to the refined flow vectors to remove impulsive estimation noise. Any suitable median filter may be used. A confidence map 316 is generated by computing a quantitative estimate of correctness, referred to as the confidence score, for each final estimated flow vector. The final estimated flow vectors and the confidence map are then packed together to form a dense optical flow map which is stored in external memory. Any suitable technique for computing confidence scores may be used.

The predictor search 300, 308 and the step search 302, 310 at each pyramid level search at each pyramid level find the best matching pixel in the reference image for each pixel in the current image. For a pixel in the current image, the search for the best matching pixel in the reference frame is restricted to a search window in the current frame. The best match is determined based a matching cost computed for the current pixel and each candidate matching pixel in the reference image. Prior to computing the matching cost, a census transform is applied to the current pixel value and the candidate matching reference pixel value to reduce error from illumination variations and a census signature for each pixel is computed based on the respective transformed value. The matching cost is then measured based on the Hamming distance between the census signatures of the pixels. Any suitable census transform and approach to computing the census signatures and Hamming distance may be used.

The predictor search 300, 308 uses predictors to prune the full search window to avoid searching for correspondence at each pixel in the search window. Such a search basically assumes spatial and temporal locality and smoothness of motion, i.e., that pixels in a small neighborhood are highly likely to have similar motion and that motion changes smoothly both spatially and temporally. Further, rather than searching for each pixel in the current frame, the search is performed for non-overlapping blocks of pixels, which is may be referred to as paxels herein. For example purposes, a paxel is assumed to be a 2×2 block of pixels. Other suitable block sizes may be used.

Figure 4:
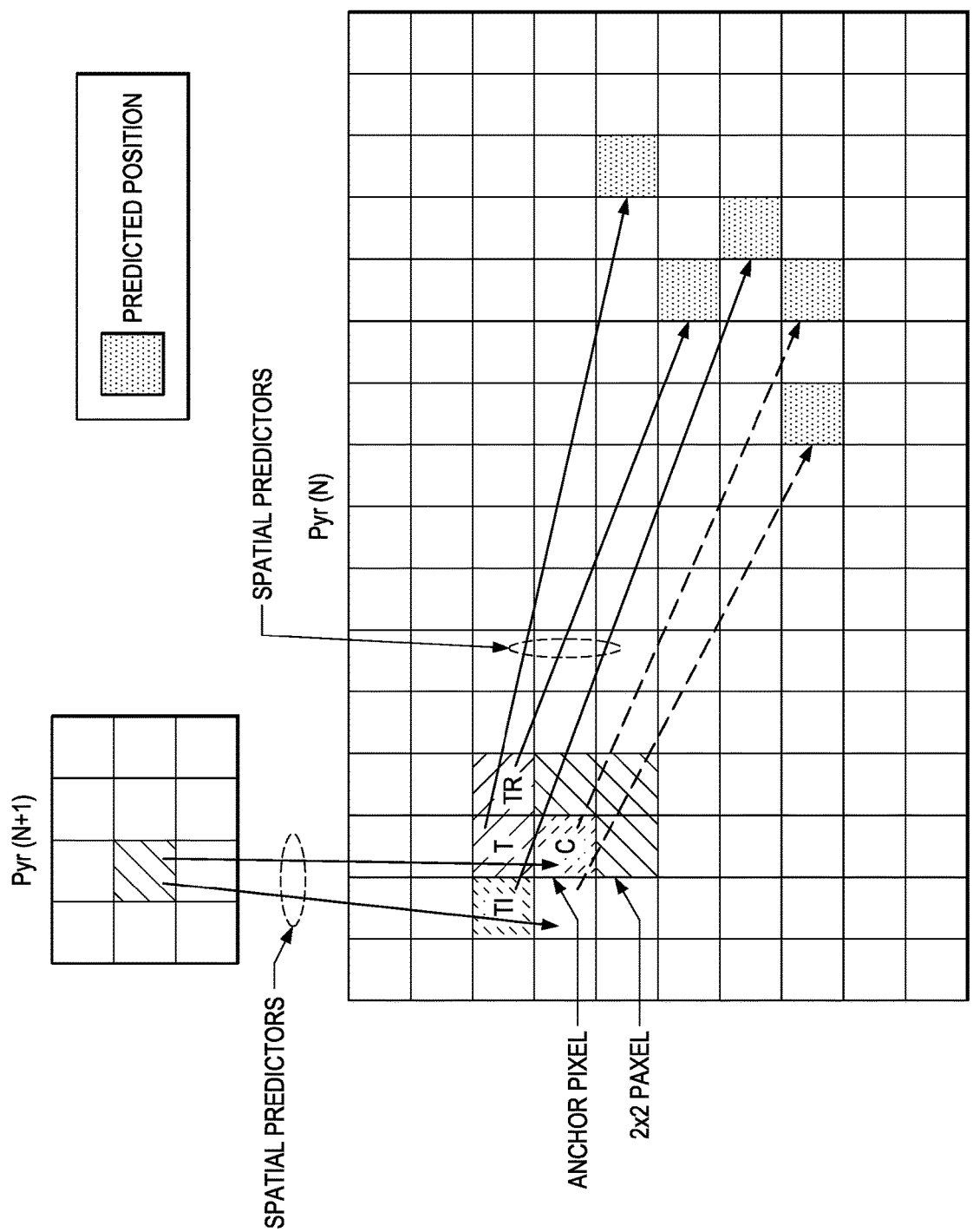
FIG. 4 shows example spatial predictors for the predictor search of the DOFE.

In the predictor search 300, 308, every 2×2 block of pixels at any pyramid level is assumed to be predictable by a set of flow vector values, which may be referred to as flow vector predictors or predictors, which are selected from the actual/estimated flow vectors of spatial or temporal neighbors of the block. The predictors are defined with respect to the top left pixel of the 2×2 pixel block, which may be referred to as the anchor pixel herein. Any suitable type and/or number of predictors may be used. In some embodiments, five spatial predictors and a single temporal predictor are used. The five spatial predictors are illustrated in FIG. 4. The spatial predictors are the flow vector of the pixel at the top left (TL) of the anchor pixel, the flow vector of the pixel at the top (T) of the anchor pixel, the flow vector of the pixel at the top right (TR) of the anchor pixel, the flow vector of the pixel to the immediate left of the anchor pixel as estimated in the previous pyramid level, and the flow vector of the pixel in the same position as the anchor pixel as estimated in the previous pyramid level. The temporal predictor is the flow vector of the pixel in the same position as the anchor pixel as estimated in the previous image.

In some embodiments, an additional spatial predictor is used, the flow vector of a pixel that is n pixels to the left of the anchor pixel in the same row. The value of n depends on the pipeline depth of the DOFE 202. This predictor may be referred to as the delayed left predictor.

The spatial predictors are used at all pyramid levels and the temporal predictor is used in the base pyramid level. The predictor that results in a matching candidate with the minimum matching cost is selected as the winning predictor for the paxel. The step search 302, 310 is then applied around the winning predictor from the predictor search 300, 308 to further refine the matching position. The step search 302, 310 is intended to refine the best matching position from the winning predictor in a limited two dimensional (2D) area around the winning predictor position. The step search 302, 310 is performed for each pixel in the paxel to determine a flow vector for each pixel.

In some embodiments, a hierarchical step search technique referred to as the 3-1 step search is used. Initially, eight pixel positions around the winning predictor position are searched. The eight pixel positions are selected such that the positions are three pixels away from the winning predictor position in each of eight directions, i.e., north, northeast, east, southeast, south, southwest, west, and northwest. The best match position from this search is further refined by choosing eight similarly positioned pixels at a one pixel distance from the best match position. The best match position from this one pixel search is selected as the final integer pixel accurate flow vector.

Figure 5:
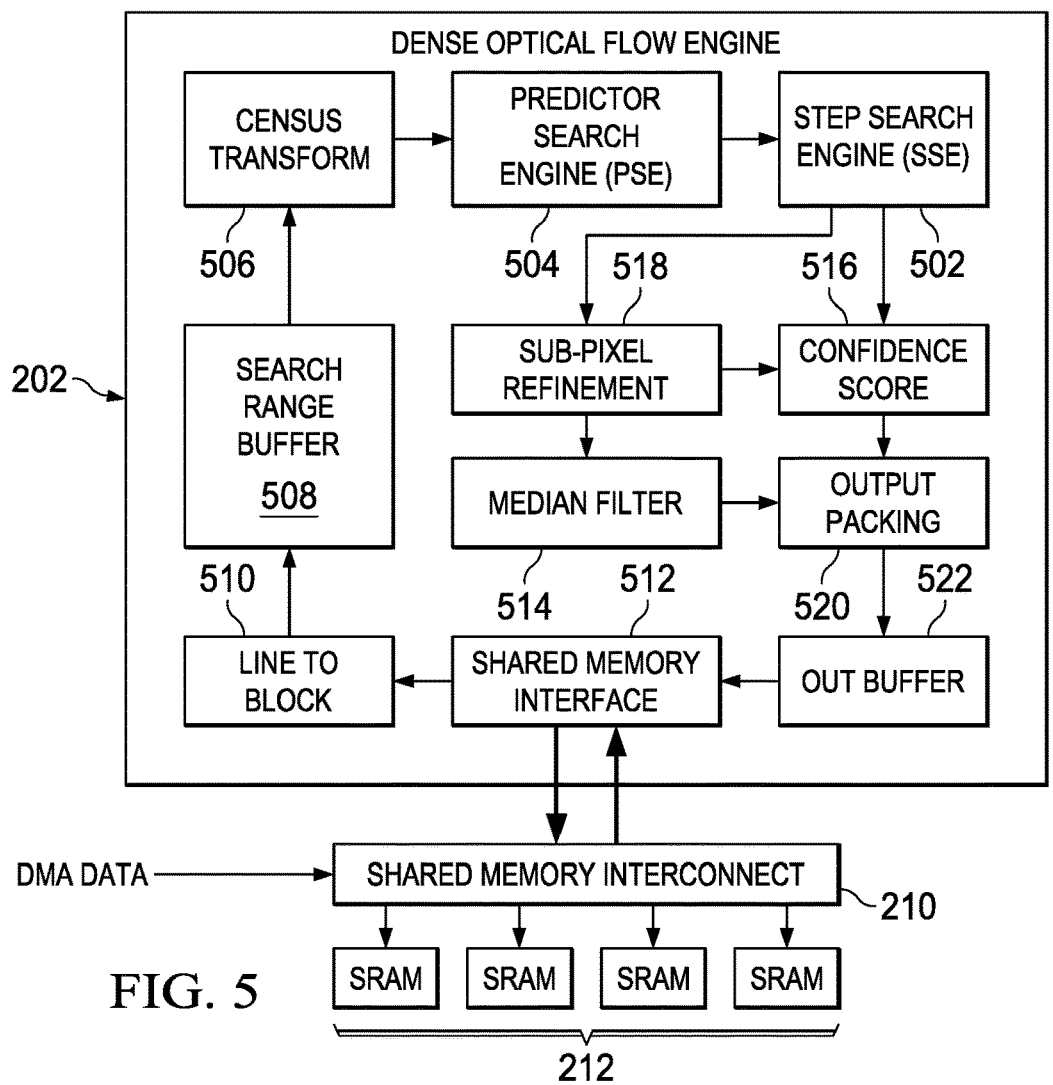
FIG. 5 is a high level block diagram of an example architecture for the DOFE.

FIG. 5 is a high level block diagram of an example architecture for the DOFE 202 of FIG. 2. A census transform component 506, a predictor search engine (PSE) 504 and a step search engine (SSE) 502 are coupled in series and are configured to perform the previously described census transform, predictor search, and step search on current and reference pixel data stored in the search range buffer 508. A sub-pixel refinement component 518 is configured to perform the previously described sub-pixel refinement on the best match positions resulting from the step search performed at the base pyramid level. A median filter component 514 is configured to perform the previously described median filtering and a confidence score component 516 is configured to generate confidence scores for the selected best match positions.

The output packing component 520 is configured to pack a stream of flow vectors from the median filter component 514 and a stream of corresponding confidence scores from the confidence score component 516 to produce a flow vector map that is stored in the output buffer 522. The shared memory interface 512 is configured to read the flow vector map from the output buffer 522 and store the map in the shared memory 512 via the shared memory interconnect 210. The flow vector map may then be transferred to external memory from the shared memory 512, e.g., the on-chip RAM 116 of FIG. 1, by the DMA 108.

Figure 6:
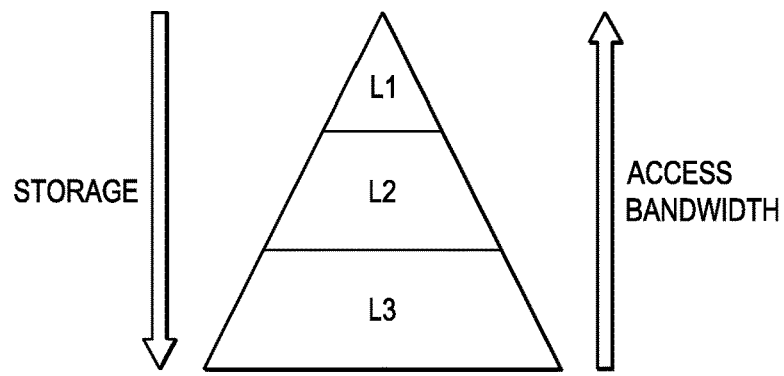
FIG. 6 shows an example data hierarchy to support the optical flow processing of the DOFE.

To optimize access bandwidth to data needed for the correspondence searches, a hierarchical data organization is used. As illustrated in FIG. 6, in some embodiments, the data hierarchy includes three levels of memory in which the amount of storage progressively decreases from level 3 (L3) to level 1 (L1) while the access bandwidth progressively increases. The L3 memory may be external to the optical flow accelerator 112, e.g., the on-chip RAM 116, while the L2 memory and the L1 memory are included in the optical flow accelerator 112 as the shared memory 212 and the search range buffer 508, respectively.

In this hierarchy, the L3 memory stores the reference and current images, the L2 memory stores a subset of concurrent pixel rows of each of the images, and the L1 memory stores a search window extracted from the reference image rows in the L2 memory. Further, the subsets of the reference image and the current image in the L2 memory may be maintained according to a growing window approach in which a circular buffer of consecutive image rows read from the L3 memory is maintained for each image in parallel with the optical flow processing. The number of rows in each of the circular buffers may be any suitable number. In some embodiments, the minimum number of rows in a growing window may be based on the number of pixels needed for the census transforms and the number of pixels needed for computing the Hamming distance as well as the vertical search range. In some embodiments, image rows are fetched from the L3 memory in paxel rows, e.g., if a paxel is 2×2, two rows are fetched.

Figure 7:
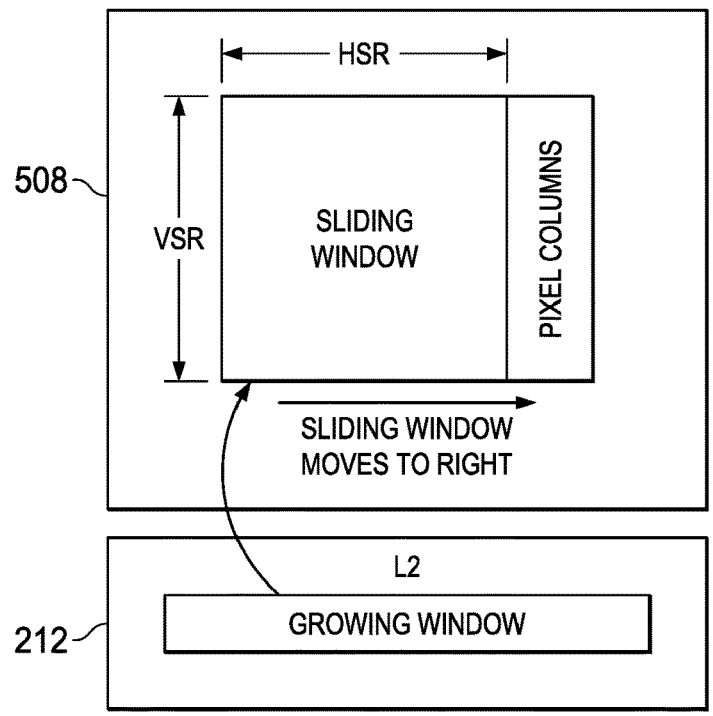
FIG. 7 shows an example sliding search window used in the optical flow processing of the DOFE.

As depicted in FIG. 7, the search window in the L1 memory, e.g., the search range buffer 508, may be maintained according to a sliding window approach in which a circular buffer of consecutive columns of pixel tiles read from the reference image growing window is maintained in parallel with the optical flow processing. As paxel processing moves right in raster scan order, new columns of pixel tiles are added while the same number of pixel tile columns is discarded. The size of the sliding window may be based on the search range for the correspondence matching.

A tiled organization is used in the search window of the L1 memory to minimize the number of memory accesses needed to perform the correspondence search. A pixel region of a size dictated by the census transform and the matching cost computation used is needed for a candidate pixel position in the reference image. Because motion is unconstrained, the flow vectors and predictors can point to any pixel position within the search range. So the pixel region for the cost computation can be centered at any pixel. If the pixels are in raster scan order, access to all the pixels in the pixel region may require multiple accesses. Arranging the reference image pixels in pixel tiles reduces the number of accesses needed.

Further, the tiles are "striped" across multiple memory banks in the L1 memory. Any suitable number of memory banks may be used. Each memory bank is sized to store multiples of whole tiles and a tile is stored in a memory bank such that it can be accessed in a single cycle. The particular arrangement of the tiles across the memory banks may depend, for example, on the number of memory banks available and the size of the search window.

Figure 8:
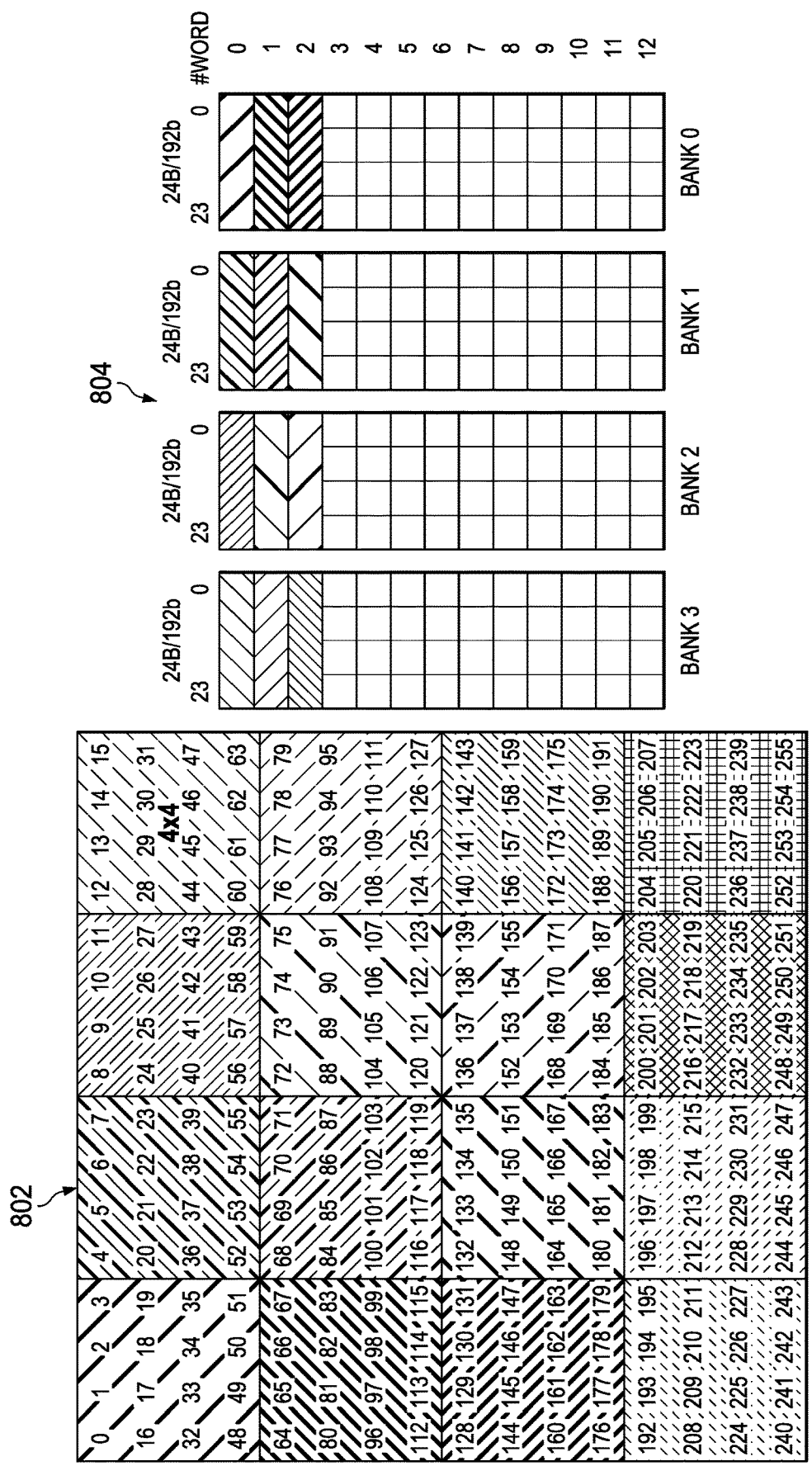
FIG. 8 is an example illustrating a tiled organization of the sliding search window.
Figure 9:
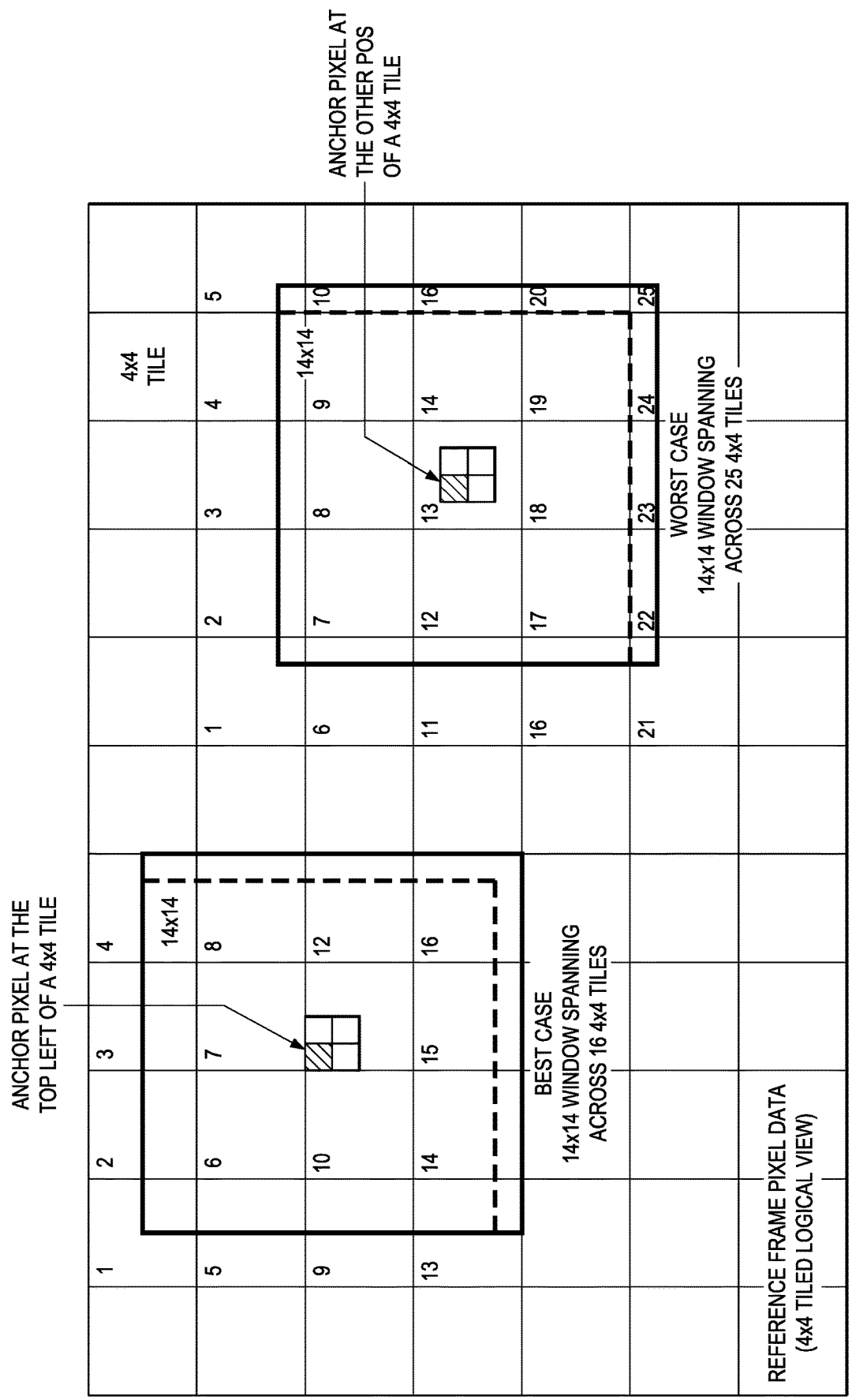
FIG. 9 is an example illustrating best and worst case memory accesses using the tiled organization.

Consider the example of FIG. 8. In this example, a 4×4 tile and four banks of memory are assumed. One of ordinary skill in the art will understand embodiments for other tiles sizes and/or other memory organizations. A small example image 802 is shown in which the raster scan ordered pixels are logically dividing into 4×4 tiles. An example L1 memory 804 is also shown. With this pixel organization, a pixel region can be decomposed in terms of 4×4 tiles and read by a limited number of accesses. For example, as illustrated in FIG. 9, a 14×14 2D region is contained in sixteen (best case) or twenty-five (worst case) 4×4 pixel tiles based on the position of the search vector, thus requiring sixteen (best case) or twenty-five (worst case) accesses to fetch the needed pixel region. In another example, there may sixteen banks of L1 memory in which vertically adjacent 4×4 tiles are placed in different banks.

Referring back to FIG. 5, the shared memory interface 512 is further configured to read pixel data for the reference frame from the growing window in the shared memory 212 via the shared memory interconnect 210. The pixel data is provided to the line to block conversion component 510 for processing and storage in the search range buffer 508. The line to block conversion component 510 is configured to convert the pixel data read from the shared memory 212 into pixel tiles for storage in the search range buffer 508. Any suitable pixel data size and pixel tile size may be used.

In some embodiments, in addition to performing the step search, the SSE 502 also performs advanced predictor evaluation for some of the predictors used by the PSE 504. That is, after determining the winning flow vector for each pixel of the current paxel, the SSE 502 evaluates the matching cost for any of these flow vectors that will be used as predictors for the next row of paxels. The flow vectors and a matching cost for the flow vectors are stored, e.g., in a first-in-first-out buffer, for use by the PSE 504. In some embodiments, a single matching cost that is the minimum of the matching costs of the flow vectors is stored.

For example, assuming a 2×2 paxel and the previously mentioned example predictors, the flow vectors of the bottom two pixels of a current paxel may be top and top right predictors for the paxel immediately below the current paxel. Thus, the SSE 502 evaluates the matching cost for these two flow vectors with respect to the pixel that will be the anchor pixel of the paxel immediately below. Further, the bottom right pixel of the current paxel may be a top left predictor for the paxel below and to the right of the current paxel. Thus, the SSE 502 evaluates the matching cost for that flow vector with respect to the pixel that will be the anchor pixel of the paxel below and to the right.

Figure 10:
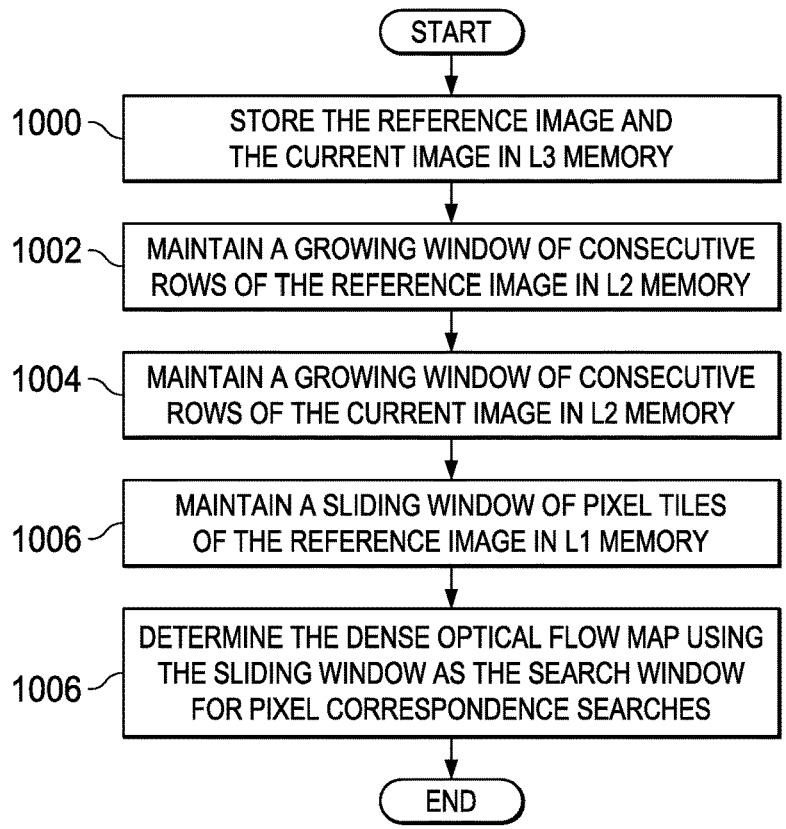
FIG. 10 is a flow diagram of a method for determining a dense optical flow map.

FIG. 10 is a flow diagram of a method for determining a dense optical flow map in a computer vision system such as the computer vision system of FIGS. 1, 2, and 5. To determine the dense optical flow map, the reference image and the current image are stored 1000 in L3 memory. Further, as the processing is performed to determine the dense optical flow map, a growing window of consecutive rows of the reference image is maintained 1002 in L2 memory and a growing window of consecutive rows of the current image is also maintained 1004 in L2 memory. A sliding window of pixel tiles formed from pixels read from the reference image growing window is also maintained in L1 memory. The dense optical flow map is determined 1008 using the sliding window as the search window for pixel correspondence searches.

OTHER EMBODIMENTS

While the disclosure has been described with respect to a limited number of embodiments, those skilled in the art, having benefit of this disclosure, will appreciate that other embodiments can be devised which do not depart from the scope of the disclosure as disclosed herein.

For example, embodiments have been described herein in reference to ADAS. One of ordinary skill in the art will understand embodiments for computer vision applications other than ADAS, such as, for example, industrial applications, robotics, and drones.

In another example, embodiments have been described herein in which the anchor pixel of a paxel is assumed to be the top left pixel. One of ordinary skill in the art will understand embodiments in which the anchor pixel may be another pixel in the paxel.

In another example, embodiments have been described herein in which the current and reference images are captured by a camera. One of ordinary skill in the art will understand embodiments in which another image generation device may be used to generate the current and reference images. For example, a graphics processor may generate consecutive synthetic images of a scene, e.g., for gaming or virtual reality applications.

In another example, embodiments have been described herein in the context of processing sequential 2D pixel images. One of ordinary skill in the art will understand embodiments in which the input is a pair of current and reference 2D maps of data points and the output is the displacement of each data point between the current 2D map and the reference 2D map. Such 2D maps of data points may include non-sequential camera images in which the pixels are the data points, heat maps in which temperatures are the data points, pressure maps with in which pressure measurements are the data points, occupancy maps in which occupancies are the data points, etc.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

Certain terms are used throughout the description and the claims to refer to particular system components. As one skilled in the art will appreciate, components in systems may be referred to by different names and/or may be combined in ways not shown herein without departing from the described functionality. This document does not intend to distinguish between components that differ in name but not function. In the description and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection, for example.

It is therefore contemplated that the appended claims will cover any such modifications of the embodiments as fall within the true scope of the disclosure.

What is claimed is:
1. A system comprising:
a memory that includes:
    a level one (L1) memory;
    a level two (L2) memory; and
    a level three (L3) memory, wherein:
        the L3 memory is configured to store a first image and a reference image;
        the first image includes a first set of pixels arranged in a first set of rows; and
        the reference image includes a second set of pixels arranged in a second set of rows; and
an image processing circuit coupled to the memory, wherein the image processing circuit includes:
    a memory interface coupled to the memory and configured to:
        cause a first subset of contiguous rows of the first set of rows to be copied from the L3 memory to the L2 memory;
        cause a second subset of contiguous rows of the second set of rows to be copied from the L3 memory to the L2 memory;
    a line-to-block circuit coupled to the memory interface and configured to divide the second set of pixels into a set of tiles, wherein the memory interface is further configured to cause a subset of the set of tiles that is within the second subset of contiguous rows of the reference image to be copied from the L2 memory to the L1 memory; and
    a predictor search engine coupled to the line-to-block circuit and configured to compare a subset of the first image to the subset of the set of tiles.

2. The system of claim 1, wherein:
the second set of pixels are further arranged in columns;
the subset of the set of tiles is a first subset of the set of tiles; and
the memory interface is further configured to cause a second subset of the set of tiles to be stored in the L1 memory by causing a first set of columns of the first subset of the set of tiles to be discarded from the L1 memory and causing a second set of columns of the second set of pixels to be copied from the L2 memory to the L1 memory.

3. The system of claim 2, wherein the predictor search engine is further configured to compare the subset of the first image to the second subset of the set of tiles.

4. The system of claim 1, wherein the memory interface is further configured to cause a third subset of contiguous rows of the first set of rows to be stored in the L2 memory by causing further rows of the first set of rows in the L2 memory to be stored with the first subset of contiguous rows.

5. The system of claim 4, wherein the memory interface is further configured to cause a fourth subset of contiguous rows of the second set of rows to be stored in the L2 memory by causing further rows of the second set of rows in the L2 memory to be stored with the second subset of contiguous rows.

6. The system of claim 1, wherein the predictor search engine is configured to:
divide the first image into a set of paxels such that each of the set of paxels includes a contiguous subset of the first set of pixels and such that the set of paxels do not overlap;
perform a predictor based correspondence search for each of the set of paxels using the L1 memory; and
for each of the set of paxels, determine an optical flow vector for each pixel of the respective paxel based on the predictor based correspondence search.

7. The system of claim 6, wherein the predictor search engine is to perform the predictor based correspondence search for each of the set of paxels by:
determining an anchor pixel of the respective paxel; and
evaluating a set of predictors to determine a matching pixel of the reference image.

8. The system of claim 1, wherein:
the L1 memory includes memory banks; and
the memory interface of the image processing circuit is configured to cause the L1 memory to store the subset of the set of tiles such that adjacent tiles of the subset of the set of tiles are stored in different memory banks of the memory banks.

9. The system of claim 8, wherein the line-to-block circuit is configured to determine a tile size of the set of tiles such that each of the memory banks is sized to store an integer multiple number of the set of tiles.

10. The system of claim 8, wherein:
the memory banks are divided into words; and
the line-to-block circuit is configured to determine a tile size of the set of tiles such that each of the set of tiles is stored in a single word of the words.

11. A method comprising:
storing a first image in a level 3 (L3) memory;
storing a reference image in the L3 memory, wherein the reference image includes a set of pixels arranged in a set of rows;
copying a subset of the set of rows of the reference image from the L3 memory to a level 2 (L2) memory;
dividing the set of pixels into a set of tiles;
copying a subset of the set of tiles within the subset of the set of rows from the L2 memory to a level 1 (L1) memory; and
comparing a subset of the first image to the subset of the set of tiles of the reference image using the L1 memory.

12. The method of claim 11, wherein:
the set of pixels of the reference image is a first set of pixels;
the set of rows of the reference image is a first set of rows;
the first image includes a second set of pixels arranged in a second set of rows; and
the method further comprises copying a subset of the second set of rows of the first image from the L3 memory to the L2 memory.

13. The method of claim 11, wherein:
the set of pixels are further arranged in columns;
the subset of the set of tiles is a first subset of the set of tiles; and
the method further comprises storing a second subset of the set of tiles in the L1 memory by discarding a first set of columns of the first subset of the set of tiles from the L1 memory and copying a second set of columns of the set of pixels from the L2 memory to the L1 memory.

14. The method of claim 13 further comprising comparing the subset of the first image to the second subset of the set of tiles of the reference image using the L1 memory.

15. The method of claim 11, wherein:
the subset of the set of rows of the reference image is a first subset; and
the method further comprises storing a second subset of the set of rows of the reference image in the L2 memory by causing further rows of the set of rows to be stored in the L2 memory with the first subset of the set of rows.

16. The method of claim 11, wherein:
the set of pixels of the reference image is a first set of pixels;
the first image includes a second set of pixels; and
the method further comprises:
dividing the first image into a set of paxels such that each of the set of paxels includes a contiguous subset of the second set of pixels and such that the set of paxels do not overlap;
performing a predictor based correspondence search for each of the set of paxels using the L1 memory; and
for each of the set of paxels, determining an optical flow vector for each pixel of the respective paxel based on the predictor based correspondence search.

17. The method of claim 16, wherein the performing of the predictor based correspondence search includes:
determining an anchor pixel of the respective paxel; and
evaluating a set of predictors to determine a matching pixel of the reference image.

18. The method of claim 11, wherein:
the L1 memory includes memory banks; and
the method further comprises storing the subset of the set of tiles in the L1 memory such that adjacent tiles of the subset of the set of tiles are stored in different memory banks of the memory banks.

19. The method of claim 18 further comprising determining a tile size of the set of tiles such that each of the memory banks is sized to store an integer multiple number of the set of tiles.

20. The method of claim 18, wherein:
the memory banks are divided into words; and
the method further comprises determining a tile size of the set of tiles such that each of the set of tiles is stored in a single word of the words.

* * * * *